(12) United States Patent
Wong et al.

(10) Patent No.: US 8,339,995 B2
(45) Date of Patent: Dec. 25, 2012

(54) NETWORK SYNC PLANNING AND FAILURE SIMULATIONS

(75) Inventors: Kin Yee Wong, Ottawa (CA); Peter Roberts, Stittsville (CA)

(73) Assignee: Alcatel Lucent, Paris (FR)

( * ) Notice: Subject to any disclaimer, the term of this patent is extended or adjusted under 35 U.S.C. 154(b) by 386 days.

(21) Appl. No.: 12/635,312

(22) Filed: Dec. 10, 2009

(65) Prior Publication Data

US 2011/0142077 A1   Jun. 16, 2011

(51) Int. Cl.
*H04L 12/28* (2006.01)
(52) U.S. Cl. .......... 370/255; 370/395.62; 370/503; 709/224; 709/248
(58) Field of Classification Search .......... 370/242, 370/254–255, 257, 258, 395.62, 408, 503, 370/509, 510; 709/223, 224, 226, 238, 242–244, 709/248, 250–252
See application file for complete search history.

(56) References Cited

U.S. PATENT DOCUMENTS

| 5,726,979 A * | 3/1998 | Henderson et al. ........... 370/254 |
| 5,751,964 A * | 5/1998 | Ordanic et al. ............... 709/224 |
| 6,269,401 B1 * | 7/2001 | Fletcher et al. ............... 709/224 |
| 6,442,615 B1 * | 8/2002 | Nordenstam et al. ......... 709/224 |
| 6,944,657 B1 * | 9/2005 | Taghadoss ..................... 709/224 |
| 2008/0144515 A1 * | 6/2008 | Ouellette et al. ............. 370/242 |
| 2008/0205294 A1 * | 8/2008 | Brune et al. .................. 370/254 |

* cited by examiner

*Primary Examiner* — Jeffrey M Rutkowski
(74) *Attorney, Agent, or Firm* — Kramer & Amado

(57) ABSTRACT

The invention is directed to a method and system for providing synchronization clock performance simulation in a timing-over-packet network having a network management system. The system retrieves information from nodes in a network and determines a timing-over-packet topology in a simulated model of the network, and determines clock stability statistics. The system further accepts simulation inputs such as addition or deletion of nodes in the simulated network, or introduction of failures into in the simulated network. The system provides predicted clock stability performance of an existing network under various simulated conditions without requiring modifications or introduction of failures to the existing network which would be useful for network optimization and network planning.

20 Claims, 2 Drawing Sheets

NETWORK SYNC PLANNING AND FAILURE SIMULATIONS

FIELD OF THE INVENTION

The invention is directed to packet switching communication networks, particularly to simulating timing-over-packet performance in a network.

CROSS REFERENCE TO RELATED APPLICATIONS

The present application is related to U.S. patent application Ser. No. 12/263,111, entitled "Common Timing Reference" (Wong et al.), and filed on Oct. 31, 2008, the entire content of which is incorporated by reference into the present application.

The present application is related to U.S. patent application Ser. No. 12/492,882, entitled "Centralized Node Clock Auto Reconfiguration" (Wong et al.), and filed on Jun. 26, 2009, the entire content of which is incorporated by reference into the present application.

The present application is related to United States Patent Application, entitled "Network Timing Topology Via Network Manager" (Wong et al.), and filed on even date herewith, the entire content of which is incorporated by reference into the present application.

BACKGROUND OF THE INVENTION

As telecommunications networks are increasingly moving from time division multiplexing (TDM) based protocols such as Synchronous Optical Networking (SONET) to packet switching technologies, maintaining network wide synchronization of nodes has become more challenging. A related challenge is network planning of synchronization topology. This is especially important when integrating TDM networks with packet switching network elements having T1 and E1 interfaces. Unlike TDM connections, packet-switched networks are not designed for network-wide synchronization of nodes. Techniques have been developed to extract timing and synchronization information from the packet data stream, generally referred to as timing-over-packet. Thus, although timing-over-packet systems can exchange timing information using packets, the inherent characteristics of the packet-switched network affect the accuracy and reliability of the synchronization. For example, unlike circuit-switched networks, packet-switched networks use variable paths with a variable bit rate, such that timing packets may arrive at nodes at varying intervals or may not arrive at all, thereby affecting the synchronization of the nodes.

Synchronization protocols such as Synchronization Status Messaging (SSM) allow for maintaining the network synchronization using a hierarchical network clocking structure of a master or primary clock such as a Stratum 1 reference and slave or secondary clocks such as Stratum 2 or Stratum 3. SSM provides for selection of the best reference to be used at each network element. SSM provides a minimal level of timing loop avoidance to ensure two adjacent network elements do not time off each other, but it does not ensure avoidance of loops involving three or more network elements. Routers and other packet switching network elements are increasingly used to provide network synchronization using timing-over-packet or synchronous Ethernet techniques. Currently SSM is not yet universal for packet switching network elements; not all telecommunication packet switching network elements support SSM. Routers may not have sufficient network intelligence to initiate automatic clock reconfiguration based on network failures.

Currently, planning of sync clock topology for timing-over-packet networks to ensure synchronization performance is becoming increasingly challenging. Typically, in order to measure sync clock performance in a timing-over-packet network, external test equipment is required to measure the timing performance and actual connections in the network need to be broken or disabled in order to measure the effect of network failures on the performance of the timing-over-packet network sync clock performance of the network. Therefore improvements in tools for planning and simulating sync clock performance for timing-over-packet networks is desired.

SUMMARY OF THE INVENTION

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

An aspect of the present invention is directed to providing synchronization clock performance simulation in a timing-over-packet network having a network management system. The method comprises the steps of: retrieving information from network nodes; determining timing-over-packet topology; determining clock stability statistics; displaying clock stability statistics; accepting simulation inputs from an operator; calculating performance of simulated network; and displaying simulated synchronization performance statistics for said simulated network.

In some embodiments of the invention the step of displaying clock stability statistics further comprises displaying timing topology for said network.

In some embodiments of the invention the step of retrieving information from network nodes comprises retrieving information selected from the set of: configuration information, connection information, and status information synchronization status messaging (SSM) data of said nodes.

In some embodiments of the invention the step of retrieving information from network nodes further comprises a step of retrieving additional static information about said network nodes from an external source.

In some embodiments of the invention the step of accepting simulation inputs from an operator comprises accepting inputs to add network nodes, delete network nodes, induce a failure in a network node, add a link, delete a link, induce a failure in a link and set alarm thresholds.

In some embodiments of the invention the step of displaying simulated synchronization performance statistics comprises displaying in a contrasting color, statistics exceeding alarm thresholds.

Another aspect of the present invention is directed to a system for providing synchronization clock performance simulation in a timing-over-packet network. The system comprises: a network manager connected to; a user interface connected to said network manager for accepting operator input and displaying information; an operation support system for running on said network manager and controlling network nodes on said timing-over-packet network; wherein the operation support system is configured to: retrieve information from said network nodes; determine timing-over-packet topology for said network nodes based on said information; determine clock stability statistics for synchronization clocks on said network nodes; display on said user interface, clock stability statistics for said network nodes; accept simulation inputs from an operator for creating a simulated network; calculate synchronization performance of said simulated network; and display on the user interface, simulated synchronization performance statistics for the simulated network.

In some embodiments of the invention the operation support system is further configured to retrieve information selected from the set of: configuration information; connection information; and status information synchronization status messaging (SSM) data of said nodes.

In some embodiments of the invention the operation support system is further configured to retrieve additional static information about the network nodes from an external source.

In some embodiments of the invention the simulation inputs comprise: adding network nodes, deleting network nodes; inducing a failure in a network node; adding a link; deleting a link; inducing a failure in a link and setting alarm thresholds.

In some embodiments of the invention the operation support system is further configured to display in a contrasting color, statistics exceeding alarm thresholds.

In some embodiments of the invention the operation support system further comprises a simulation tool to perform the synchronization clock performance simulation actions.

Yet another aspect of the present invention is directed to providing a program storage device readable by a machine, tangibly embodying a program of instructions executable by the machine to perform method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
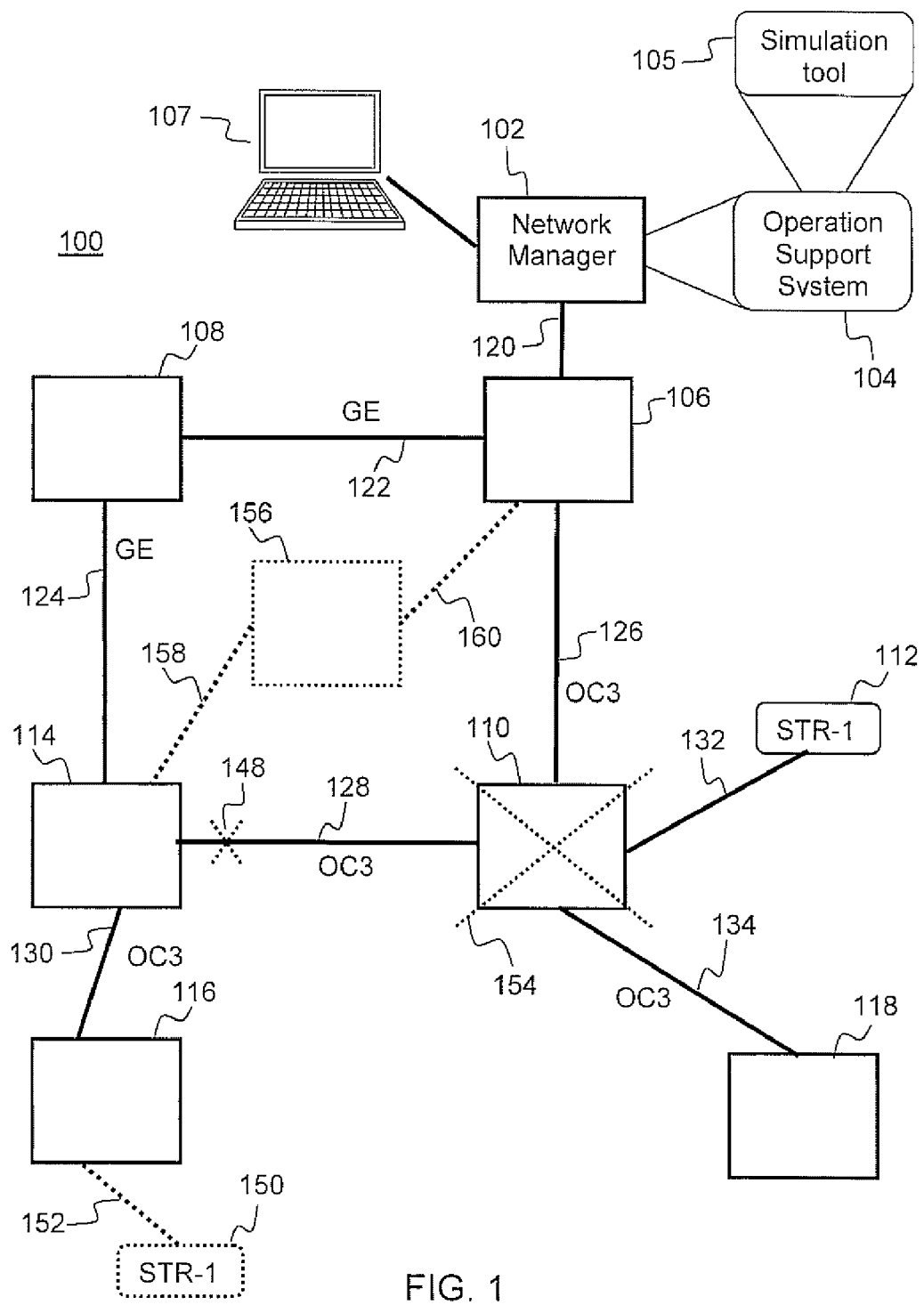
FIG. 1 illustrates a packet switching network configuration for providing synchronization clock performance simulation in a timing-over-packet network.

Referring to FIG. 1, communications network configuration 100 has network nodes 106, 108, 110, 114, 116, 118 interconnected via communications links 122, 124, 126, 128, 130, 134. Network nodes can include switches, routers, SONET/SDH Multiplexers (Muxs), and timing sources (e.g.: SSU/BITS/GPS/1588 Grand Master (GM) clocks).

Node 112 provides a high quality stratum 1 clock which can act as a timing source for the network via communications link 132 to node 110. Other types of high quality clocks include Global Positioning Satellite (GPS) clocks or atomic clocks. The exemplary network 100 has a combination of OC3 synchronous communication links 126, 128, 130, 134 and timing-over-packet Gigabit Ethernet links 122, 124 to illustrate that many communications networks need to be able to handle both synchronous layer 1 links and packet switched links which require timing-over-packet techniques, as will be understood by persons skilled in the art. Synchronous communications links transmit clock information via line timing and can include OC3/STM1, T1, E1/SDH or synchronous Ethernet. Timing-over-packet technologies include IEEE 1588v2, Adaptive Clock Recovery (ACR), and IETF Network Time Protocol (NTP).

Network Manager 102 provides Operations, Administration, Maintenance (OAM) support and control of the network nodes using Operation Support System (OSS) application software 104 and communicates to nodes in network 100 via communications link 120 to node 106. The OSS application software 104 and network manager 102 can be referred to collectively as a network management entity. An operator can control the network manager 102 via user interface 107.

As illustrated in FIG. 1, simulation tool 105 forms part of Operation Support System (OSS) application software 104. In other embodiments, simulation tool 105 is separate from the OSS application software 104 and interfaces to the OSS application software 104 within the Network Manager 102. Description of the operation of the present invention will characterize the action as taking place within the Operation Support System 104, although it will be apparent to persons of skill in that art that aspects of the operation could take place within the Simulation Tool 105, and that these variations are considered within the scope of the present invention.

Figure 2:
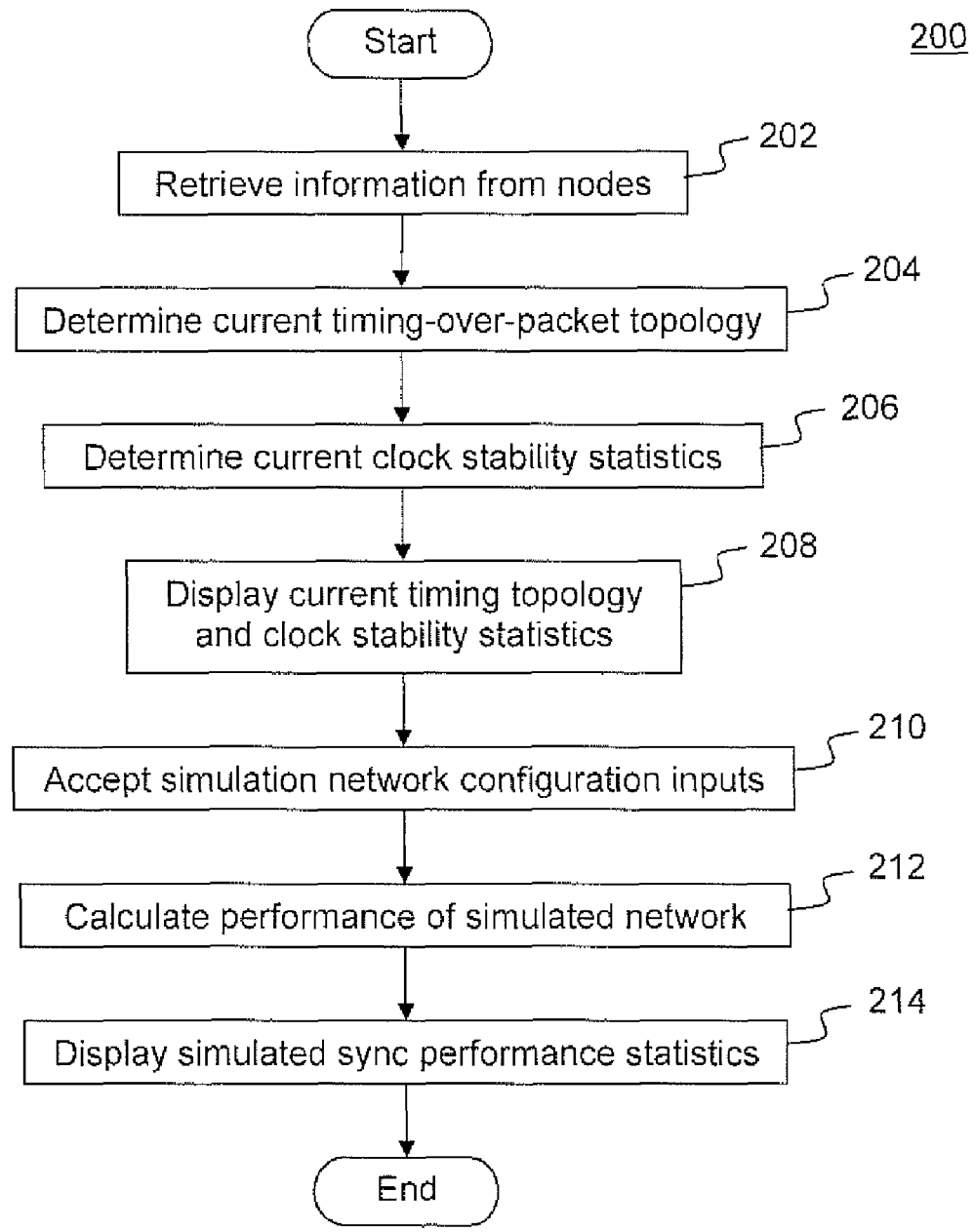
FIG. 2 illustrates a method for providing synchronization clock performance simulation in a timing-over-packet network according to the embodiment depicted in FIG. 1.

The operation of the present invention will now be described with reference to the network diagram of FIG. 1 and steps 202-214 of the flowchart 200 of FIG. 2. At step 202, the OSS application software 104 on network manager 102 retrieves information such as configuration, connection and status information from network nodes 106, 108, 110, 114, 116, 118 via Command Line Interface (CLI) or Simple Network Management Protocol (SNMP) or Transaction Language 1 (TL1) messaging. Optionally, additional static information can be retrieved from an external source, such as database external or internal to the Network Manager 102, or entered manually by an operator via user interface 107. The interactive user interface has a visual output device such as a computer monitor or LCD screen and a user input device such as a keyboard, keypad, mouse, or track pad, and can comprise a personal computer or workstation, or independent input and output elements as would be well understood by persons skilled in the art. Node information may include synchronization status messaging (SSM) data. Network nodes can include switches, routers, SONET/SDH multiplexors, or dock sources such as: System Synchronization Unit (SSU)/Building Integrated Timing Supply (BITS)/Global Positioning System (GPS) docks/IEEE 1588v2 Grand Master (GM) clocks.

At step 204 the OSS application software 104 determines current timing topology from the retrieved information. At step 206, the OSS application software 104 determines or calculates dock stability statistics for the each of the network nodes 106, 108, 110, 114, 116, 118.

At step 208, the OSS application software 104 displays the current timing topology of the nodes in the network and clock stability statistics for the nodes in the network. The network topology is displayed graphically or hierarchically on the user interface 107, showing the interconnections between network nodes. Clock stability statistics such as clock quality, clock source identification, offset frequency mean and standard deviation; and phase error mean and standard deviation for each time interval, are displayed for each network node. These are displayed adjacent to the graphical representation of the corresponding network node, on the network topology display. Alternatively, the clock stability statistics are displayed sequentially in a text format.

The OSS application software 104 provides configurable alarming based on: clock failures such as clock holdover or free-run; or clock stability thresholds such as a failure range or danger range. The alarm conditions are conveyed to the operator by displaying clock statistics exceeding the threshold in a contrasting color such as red, instead of a default display color, or by displaying affected links or network nodes on the network topology display in a contrasting color. The OSS application software 104 accepts input from the operator to adjust alarm thresholds as required.

At step 210, the OSS application software 104 accepts simulation network configuration inputs from the operator to configure simulation scenarios. These scenarios can be based on real network information as described above, as a starting point, or a simulated network can be assembled from scratch using the tools as described below. The operator can select a network node such as node 110 and select a new status such as "fail" illustrated by "X" 154. In the same manner, existing nodes can be deleted from the network. The operator can select a link such as link 128 and select a new status such as "fail" illustrated by "X" 148. The operator can add simulated nodes such as node 156. Various types of network nodes can be added such as switches, routers, clock sources, etc. Various parameters can be set for each simulated node such as the performance characteristics of the internal clocks within the simulated nodes.

The operator can add simulated links such as links 158, 160. Various types of links can be added such as synchronous optical links, timing-over-packet links, etc. The additions, deletions, failures input by the operator are displayed on the network topology display as they are entered by the operator.

At step 212, the OSS application software 104 calculates timing performance of each of the network nodes in the simulated network by modeling the clock source selection process of each node. Alternatively, the OSS application software 104 applies the rules defined within the Network Manager 102 for synchronization distribution and displays how the nodes would reconfigure synchronization distribution autonomously. The OSS application software 104 would then raise alarms if nodes did not have Layer 1 synch distribution traceable to an acceptable quality source or if the timing-over-packet flow to deliver synch was going over an unacceptable path (e.g.: link speed too low, too many links, . . . ). The OSS application software 104 can also indicate if after the addition of a simulated node or a simulated failure at step 210, if every node has a redundant synchronization source path of acceptable quality.

At step 214, the OSS application software 104 displays simulated clock stability statistics for the each of the network nodes in the simulated network.

The simulation features of embodiments of the present invention can show to the operator, the predicted clock stability performance of a simulated network or simulated failures or additions or modifications to an existing network. This is very useful information to aid in optimization of telecommunications networks to lower costs and improve synchronization performance, or to help plan effective network growth and expansion. Additionally, borderline scenarios can be explored to determine failure thresholds or weaknesses in the network topology. Therefore, embodiments of the present invention can obviate the need for external test equipment to measure actual performance and disabling live connections in order to determine responses to various scenarios.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g.: digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of providing synchronization clock performance simulation in a timing-over-packet network having a network management system, the method comprising the steps of:
   retrieving information from network nodes;
   determining timing-over-packet topology;
   determining clock stability statistics;

displaying clock stability statistics;
accepting simulation inputs from an operator wherein the simulation inputs include at least one of:
an input to delete a network node, and
an input to induce a failure in a network node;
calculating performance of a simulated network; and
displaying simulated synchronization performance statistics for said simulated network.

2. The method of claim 1, wherein the step of displaying clock stability statistics further comprises displaying timing topology for said network.

3. The method of claim 1, wherein the step of retrieving information from network nodes comprises retrieving information selected from the set of: configuration information, connection information, and status information synchronization status messaging (SSM) data of said nodes.

4. The method of claim 1, wherein the step of retrieving information from network nodes further comprises a step of retrieving additional static information about said network nodes from an external source.

5. The method of claim 1, wherein the simulation inputs comprise inputs to add network nodes, delete network nodes, induce a failure in a network node, add a link, delete a link, induce a failure in a link and set alarm thresholds.

6. The method of claim 5, wherein the step of displaying simulated synchronization performance statistics comprises displaying in a contrasting color, statistics exceeding the alarm thresholds.

7. The method of claim 1, wherein the simulation inputs include an input to delete a network node.

8. The method of claim 1, wherein the simulation inputs include an input to induce a failure in a network node.

9. The method of claim 1, wherein calculating the performance of the simulated network comprises simulating a clock source selection process of at least one node of the simulated network.

10. The method of claim 1, wherein calculating the performance of the simulated network comprises determining that the simulated network violates an alarm condition.

11. A system for providing synchronization clock performance simulation in a timing-over-packet network, said system comprising:
a network manager;
a user interface connected to said network manager for accepting operator input and displaying information;
an operation support system for running on said network manager and controlling network nodes on said timing-over-packet network;
wherein said operation support system is configured to:
retrieve information from said network nodes;
determine timing-over-packet topology for said network nodes based on said information;
determine clock stability statistics for synchronization clocks on said network nodes;
display on said user interface, clock stability statistics for said network nodes;
accept simulation inputs from an operator for creating a simulated network, wherein the simulation inputs include at least one of:
an input to delete a network node, and
an input to induce a failure in a network node;
calculate synchronization performance of said simulated network; and
display on said user interface, simulated synchronization performance statistics for said simulated network.

12. The system of claim 11, wherein said operation support system is further configured to retrieve information selected from the set of: configuration information; connection information; and status information synchronization status messaging (SSM) data of said nodes.

13. The system of claim 11, wherein said operation support system is further configured to retrieve additional static information about said network nodes from an external source.

14. The system of claim 11, wherein said simulation inputs comprise: adding network nodes, deleting network nodes, inducing a failure in a network node, adding a link, deleting a link, inducing a failure in a link and setting alarm thresholds.

15. The system of claim 11, wherein said operation support system is further configured to display in a contrasting color, statistics exceeding alarm thresholds.

16. The system of claim 11, wherein said operation support system further comprises a simulation tool to perform said synchronization clock performance simulation actions.

17. The system of claim 11, wherein the simulation inputs include an input to delete a network node.

18. The system of claim 11, wherein the simulation inputs include an input to induce a failure in a network node.

19. The system of claim 11, wherein, in calculating synchronization performance of the simulated network, the operation support system is configured to simulate a clock source selection process of at least one node of the simulated network.

20. A non-transitory program storage device readable by a machine, tangibly embodying a program of instructions executable by the machine to perform method steps of claim 1.

* * * * *